United States Patent [19]

Lidington

[11] 3,843,195

[45] Oct. 22, 1974

[54] HINGED DRAUGHT DEFLECTORS FOR VEHICLES

[75] Inventor: Frederick Charles Lidington, Birmingham, England

[73] Assignee: Weathershields Limited, Birmingham, England

[22] Filed: May 15, 1973

[21] Appl. No.: 360,563

[30] Foreign Application Priority Data
May 18, 1972 Great Britain .................... 23419/72

[52] U.S. Cl. ............................. 296/137 J, 98/2.14
[51] Int. Cl. .............................................. B60j 7/22
[58] Field of Search .. 296/91, 137 C, 137 D, 137 E, 296/137 F, 137 J; 98/2.14

[56] References Cited
UNITED STATES PATENTS
3,156,175   11/1964   Werner ................................ 98/2.14

FOREIGN PATENTS OR APPLICATIONS
980,012   1/1965   Great Britain ................... 296/137 F
184,834   2/1956   Austria ........................... 296/137 D
514,751   10/1952   Belgium .......................... 296/137 F
1,149,627   5/1963   Germany ......................... 296/137 F
534,498   10/1955   Italy .............................. 296/137 E Primary Examiner—Robert J. Spar
Assistant Examiner—Leslie J. Paperner
Attorney, Agent, or Firm—Scrivener, Parker, Scrivener & Clarke

[57] ABSTRACT

A draught deflector for a passenger road vehicle comprises a transverse flap adapted to be pivotally connected at its forward edge to the upper surface of a front member defining the forward end of a longitudinal roof opening. The flap is coupled to the free ends of a pair of blade springs of which the inner ends are adapted to be connected to longitudinally extending guide rails defining opposite sides of the roof opening. Normally the blade springs urge the flap into an operative rearwardly and upwardly extending position and the flap is moved automatically into an inoperative generally horizontal position when a longitudinally movable assembly guided between the guide rails engages with and depresses the blade springs as the assembly is moved towards the front member to close the opening.

8 Claims, 6 Drawing Figures

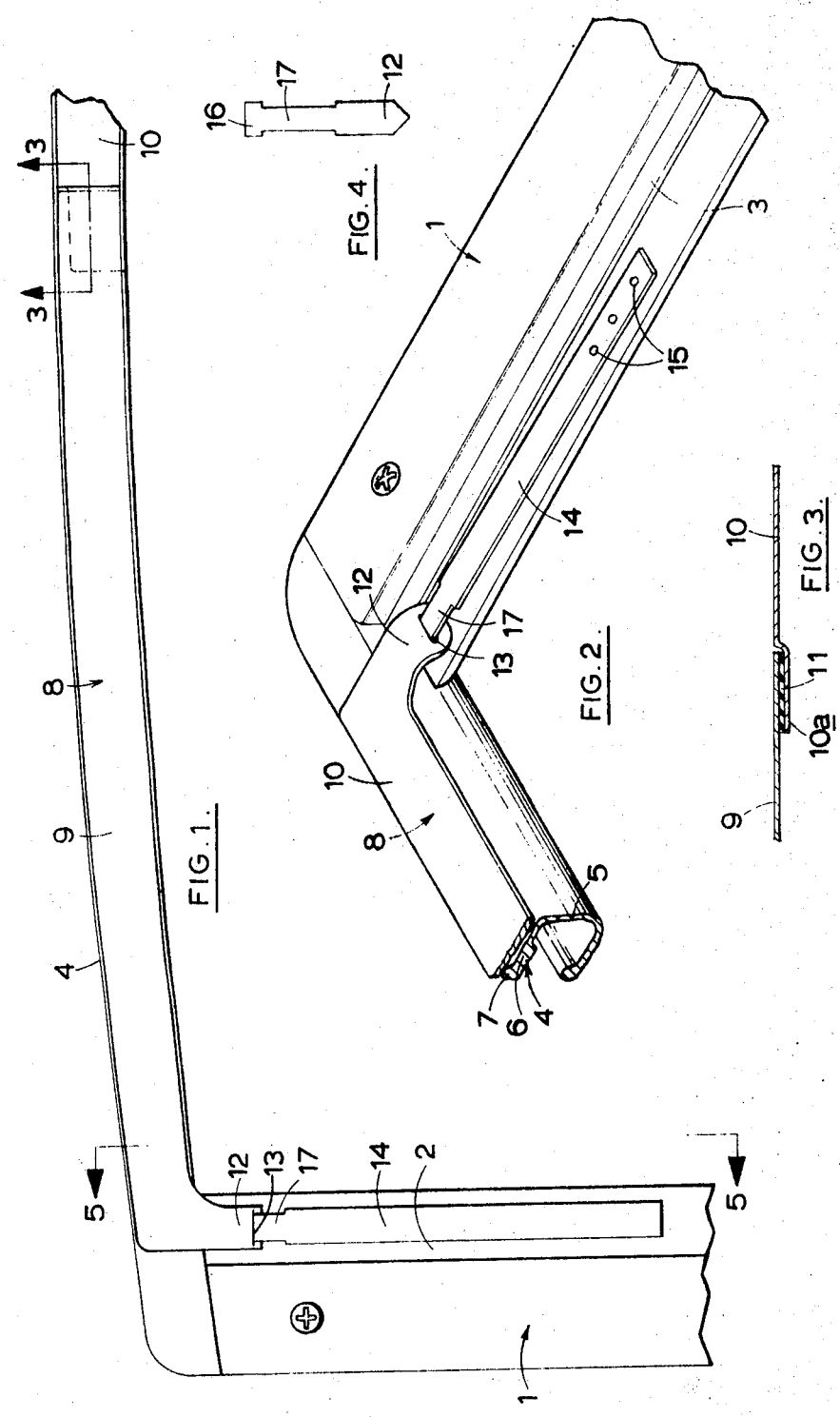

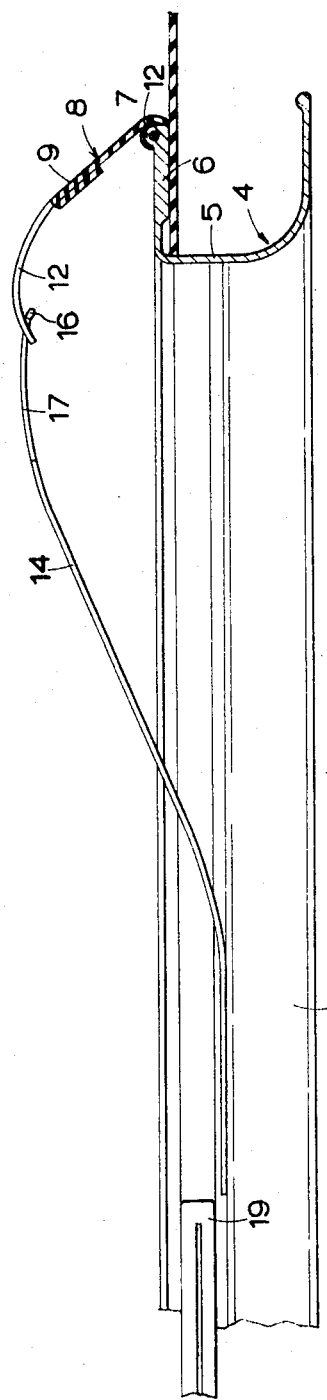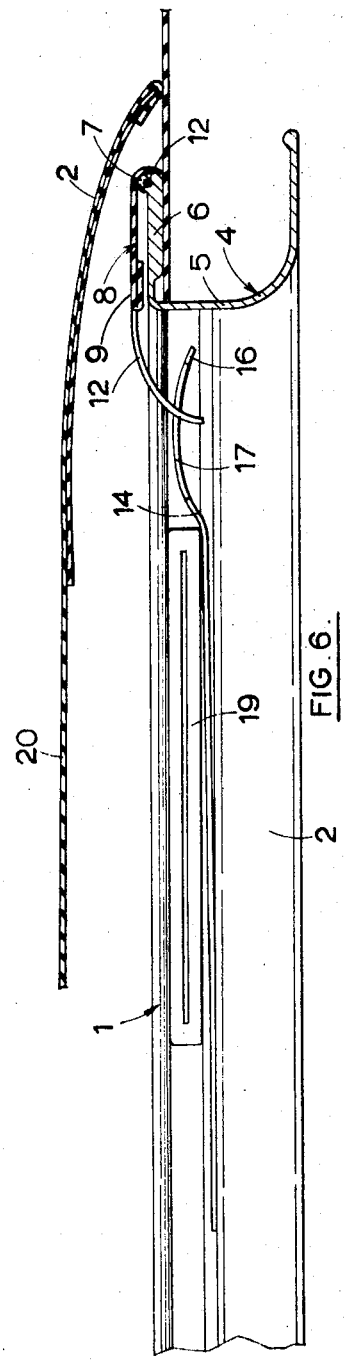

HINGED DRAUGHT DEFLECTORS FOR VEHICLES

This invention relates to a new or improved draught deflector for passenger road vehicles having a longitudinal opening in the roof adapted to be closed by a longitudinally movable assembly, the deflector being of the kind comprising a transverse flap located at the front end of the roof opening and movable between a generally horizontal inoperative position and an operative position in which it extends rearwardly and upwardly to deflect upwardly air flowing over the windscreen and the front part of the roof when at least the front part of the opening is exposed.

In one known construction of draught deflector of the kind set forth the transverse flap is pivotally connected adjacent to the lower edge of a member defining the forward end of the roof opening and is coupled to the free ends of a pair of spring-loaded lever arms which are adapted to urge the flap into its operative position, and with which the movable assembly is adapted to engage to move the flap angularly into its operative position within the roof opening so that the movable assembly can slide over it.

In such a construction the member defining the forward end of the roof opening is substantially straight. When the member is of curved outline it is extremely difficult and substantially impossible to instal the flap satisfactorily without the presence of a substantial clearance between the flap and the member. This causes draughts when the member is in its operative position.

According to our invention in a draught deflector of the kind set forth for passenger road vehicles the flap is adapted to be pivotally connected to the upper face of a front member defining the forward end of the roof opening, and the flap is coupled to the free outer ends of a pair of blade springs of which the inner ends are adapted to be connected to longitudinally extending guide rails defining opposite sides of the roof opening, the arrangement being such that when the deflector is installed in a vehicle and at least the front part of the roof opening is exposed, the resilience of the blade springs normally urges the flap into the operative position, the flap being urged into an inoperative position substantially parallel with and spaced above the front member upon depression of the blade springs by the engagement therewith of the longitudinally movable assembly as the assembly is moved forwardly to close the opening.

Mounting the flap on the upper surface of the front member facilitates installation and enables the deflector to be installed in a vehicle where the front member is of curved outline. In such an installation the flap is constructed from two separate portions which are each hingedly connected at opposite ends to the front member, and adjacent ends of the portions are interconnected by a mechanical interlock whereby the portions can move relative to each other as the flap is hinged between its operative and inoperative positions.

One embodiment of our invention is illustrated in the accompanying drawings in which:

FIG. 1 is a plan view of a major portion of a draught deflector for a passenger road vehicle showing a portion of an opening in the roof of the vehicle;

FIG. 2 is a perspective view of the remainder of the draught deflector at the opposite side of the opening;

FIG. 3 is a section through the draught deflector on the line 3 — 3 of FIG. 1;

FIG. 4 is a plan of the outer end portion of a blade spring;

FIG. 5 is a section of the line 5 — 5 of FIG. 1; and

FIG. 6 is a section similar to FIG. 5 with the flap in the lowered position inoperative position.

In the accompanying drawings a rectangular frame 1 surrounds an opening in a roof of a vehicle. The frame comprises a pair of parallel spaced longitudinal guide rails 2, 3, interconnected at opposite ends to the opposite ends of parallel spaced transverse members of which only the front member is illustrated at 4. The front member 4 includes an upstanding flange 5 and a forwardly directed flange 6 which is continuous with the upper edge of the flange 5. The forward edge of the flange 6 terminates in an upwardly directed semicircular bead or rib 7. The frame member 4 is outwardly curved in plan as will be seen from FIG. 1.

According to our present invention a transverse draught deflector is adapted to be hingedly connected to the front member 4. As illustrated in the drawings the deflector comprises a flap 8 of metal or synthetic plastics material, which corresponds to the curvature of the front member 4. The flap 8 is constructed from two separate portions 9 and 10 which overlap at adjacent ends with the inner end of the flap portion 9 being superimposed upon the complementary inner end of the flap portion 10 which is joggled at 10a. A strip or pad 11 of resilient material is secured between the mating faces of the overlapping ends of the flap portions 9 and 10.

Each flap portion 9 and 10 is hingedly connected to the bead or rib 7 at two transversely spaced points. This is achieved by removing four spaced portions of the bead or rib 7 to receive two downwardly directed hinge parts at the forward edge of end flap portions 9 and 10, and the hinge parts are hingedly retained therein by means of pins 12.

The outer end of end flap portions 9, 10 includes a rearwardly directed lug 12 of which a free end portion is curved downwardly with respect to the plane of the flap 8 and is provided with a transverse slot 13. Each lug 12 is coupled to the forward end of a blade spring 14 which, in turn, is rigidly connected at its inner end to a respective guide rail 2, 3 by suitable securing means, for example rivets 15. The coupling between each spring 14 and a lug 12 is shown in detail in FIG. 4 and comprises a head 16 at the free end of a shank portion 17 of the blade spring which is of reduced width. The shank portion 17 is of a width slightly less than that of the slot 13 which, in turn, is of a width less than that of the head 16. By including a spring 14 laterally with respect to a lug 12, the head 16 can be inserted through the slot 13 so that the shank portion 17 is received and retained therein after the blade spring 14 has been moved laterally in the opposite direction and into a position normal to the plane of the notch.

The blade springs 14 are constructed and arranged such that in an unstressed condition they extend upwardly to maintain the deflector in a upwardly and rearwardly extending operative position as illustrated in FIG. 5, when at least the forward end of the opening is exposed. This operative position is defined by the engagement of the heads 16 with the regions of the lugs 12 which surround the slot 13.

A longitudinally movable assembly 19 comprising or forming part of a closure for the roof opening is guided at opposite sides to slide in channels defined in the guide rails 2 and 3 above the blade springs 14.

When the longitudinally movable assembly 19 is in a closed position as shown in FIG. 6 the forward edge of the assembly deflects the blade springs 14 downwardly which shortens their effective lengths, at the same time pivoting the flap 8 abouts its hinged connections and into an inoperative generally horizontal position with the shank portions 17 of reduced width sliding through the slot 13.

The provision of the strip or pad 11 permits the flap portions 9 and 10 to move relative to each other as the flap 8 is hinged between its operative and inoperative positions.

Our deflector may be used in a vehicle in which the opening in the roof is adapted to be closed by a slidable panel.

Preferably, however, our deflector is used in a vehicle in which the roof opening is adapted to be covered by a flexible fabric or like covering 20 which is anchored at its rear end to the rear end of the opening and is supported by cross-members adapted to slide along the rails 2, 3 on opposite sides of the opening. In such a construction the front cross-member 19 is adapted to engage the blade springs. Conveniently the construction is in accordance with our United Kingdom Patent No. 989,694 in which the front end of the fabric covering is attached to a sheet metal or other substantially rigid flap or like member 21, pivotally connected to the front cross-member 19 and adapted to be drawn down into close sealing engagement with the front end of the opening by means actuated by handle operated means (not shown) for tightening the covering. When the fabric covering 20 is moved towards the forward end of the roof to cover the opening, the front cross-member 19 depresses the blade springs 14 which, in turn, urge the flap 8 into the inoperative position. When the front cross-member reaches the extent of its travel in that direction the deflector flap lies below and wholly within the planform area of the sheet metal member 21 pivotally connected to the front cross member 19. When the handle-operated means are operated to draw the sheet metal member down into engagement with the front end of the opening, the deflector flap 8 is accommodated in the space between the sheet metal member 21 and the front end of the opening, being completely and entirely concealed from view both inside and outside the vehicle.

1. A draught deflector for an opening roof of a passenger road vehicle of the type comprising a vehicle roof having a longitudinal opening therein, front and rear transverse members at opposite ends of said opening, longitudinally extending guide rails at opposite sides of said opening, and a longitudinally movable assembly slidably guided between said rails between a first position in which said opening is closed and a second position in which at least a portion of said opening at its front end is exposed, said draught deflector comprising a transverse flap, hinge means for pivotally connecting said flap to the upper face of said front member, a pair of blade springs having inner and outer ends, connecting means for connecting said inner ends to said guide rails, and coupling means coupling said outer ends to said flaps and so constructed and arranged that when the deflector is installed in a vehicle and at least said portion of said opening at said front end is exposed, resilience of said blade springs urges said flap into an operative rearwardly and upwardly extending position, said flap being urged into an inoperative position substantially parallel with an spaced above said first member upon depression of said blade springs by the engagement therewith of said longitudinally movable assembly as said assembly is moved into said first postion, wherein said outer ends of said blade springs are coupled to said flap for sliding movement relative thereto as said flap is moved between said operative and inoperative positions, and an engagement between each blade spring and said flap defines said operative position of said flap.

2. A draught deflector as claimed in claim 1, wherein rearwardly directed lugs provided with transverse slots are provided at opposite ends of said flap and shank portions of blade springs which are of reduced width are slidably received within said notches, a head at the said free end of each said shank portion engaging with a region of said lug surrounding said slot to define a stop maintaining said flap in said operative position.

3. A draught deflector as claimed in claim 1, wherein said flap has a forward edge and said hinge means is adapted to pivotally connect said forward edge to said front member.

4. A draught deflector as claimed in claim 1, wherein said flap is constructed from two separate flap portions and said hinge means is adapted to connect hingedly each flap portion to said front member at spaced points.

5. A draught deflector as claimed in claim 4, wherein said flap is of curved outline and adjacent ends of said flap portions overlap each other, resilient means coupling said overlapping ends being provided to permit relative movement between said flap portions as said flap is moved between said operative and inoperative positions.

6. In combination: a vehicle opening roof and a draught deflector, said combination comprising a frame surrounding a longitudinal opening in a vehicle roof and including longitudinally extending spaced guide rails and a front transverse member interconnecting forward ends of said guide rails, a longitudinally movable assembly slidably guided between said said rails between a first postion in which said opening is closed and a second position in which at least a portion of said opening at its front end is exposed, a transverse flap, hinge means pivotally connecting said flap to the upper face of said front member, a pair of blade springs having inner and outer ends, connecting means connecting said inner ends to said guide rails below said longitudinally movable assembly, and coupling means coupling said outer ends to said flap and so constructed and arranged that when at least said portion of said opening at said front end is exposed, resilience of said blade springs urges said flap into an operative rearwardly and upwardly extending position, and engagements between said longitudinally movable assembly and said blade springs as said assembly is moved into said first position to depress said blade springs and urge said flap into an inoperative position substantially parallel with and spaced above said front member, wherein said outer ends of said blade springs are coupled to said flap for sliding movement relative thereto as said flap is moved between said operative and inoperative positions, and an engagement between each blade spring and said flap defines said operative position of said flap.

7. The combination as claimed in claim 6, wherein said longitudinally movable assembly comprises a longitudinally slidable panel.

8. The combination as claimed in claim 6, wherein said longitudinally movable assembly comprises a flexible fabric covering which is anchored at its rear end to the rear end of said opening, and cross-members adapted to slide along said guide rails supporting said fabric covering of which the front cross-member adjacent to said front transverse member is adapted to engage said blade springs as said longitudinally movable assembly is moved towards said first position.

* * * * *